(12) United States Patent
Taxis

(10) Patent No.: US 8,214,004 B2
(45) Date of Patent: Jul. 3, 2012

(54) DRIVER INFORMATION SYSTEM

(75) Inventor: Heiko Taxis, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 759 days.

(21) Appl. No.: 10/706,221

(22) Filed: Nov. 12, 2003

(65) Prior Publication Data

US 2004/0114934 A1    Jun. 17, 2004

(30) Foreign Application Priority Data

Nov. 13, 2002    (DE) .................................. 102 52 689

(51) Int. Cl.
    H04M 1/00    (2006.01)
(52) U.S. Cl. .................. 455/575.9; 455/66.1; 455/90.3; 455/566; 455/575.1; 345/169; 345/168
(58) Field of Classification Search .................. 455/66.1, 455/90.3, 575.1–575.9, 425, 550.1, 573.3, 455/347, 569.2, 41.2, 456.3, 411, 414.3, 455/99, 100, 566, 569; 370/378; 701/200, 701/300, 207, 208; 361/331, 679, 600–632, 361/680; 340/988–996; 342/450–465; 345/169, 345/168

See application file for complete search history.

(56) References Cited

U.S. PATENT DOCUMENTS

| | | | | |
|---|---|---|---|---|
| 4,366,482 A | * | 12/1982 | Remes et al. ............ | 340/825.69 |
| 5,528,235 A | * | 6/1996 | Lin et al. .................. | 341/22 |
| 5,734,137 A | * | 3/1998 | Wakefield .................. | 200/5 A |
| 5,892,192 A | * | 4/1999 | Ishiguro et al. ............ | 200/5 R |
| 5,946,120 A | * | 8/1999 | Chen ......................... | 398/155 |
| 6,130,727 A | * | 10/2000 | Toyozumi .................. | 348/837 |
| 6,140,593 A | * | 10/2000 | Bramesfeld et al. ........ | 200/5 A |
| 6,304,803 B1 | * | 10/2001 | Dao ............................ | 701/36 |
| 6,629,183 B1 | * | 9/2003 | Gortz et al. ................ | 710/305 |
| 6,947,760 B2 | * | 9/2005 | Weisshaar et al. .......... | 455/509 |
| 7,010,756 B2 | * | 3/2006 | Nagasaka et al. .......... | 715/810 |
| 2003/0080619 A1 | * | 5/2003 | Bray et al. .................. | 307/10.1 |
| 2003/0220988 A1 | * | 11/2003 | Hymel ........................ | 709/220 |

FOREIGN PATENT DOCUMENTS

| | | |
|---|---|---|
| DE | 39 13 266 A1 | 10/1990 |
| DE | 197 11 788 A1 | 9/1998 |
| DE | 198 24 197 A1 | 12/1998 |
| DE | 198 39 811 A1 | 3/2000 |
| DE | 199 55 070 A1 | 5/2000 |
| DE | 199 08 087 A1 | 8/2000 |
| DE | 199 17 191 A1 | 10/2000 |
| DE | 100 60 981 A1 | 7/2002 |
| DE | 101 52 626 A1 | 7/2002 |
| DE | 101 06 965 A1 | 9/2002 |
| EP | 0 983 907 A2 | 3/2000 |

\* cited by examiner

Primary Examiner — Olumide T Ajibade Akonai
Assistant Examiner — Emem Stephen

(57) ABSTRACT

A driver information system comprises an operating device 10 having at least two operational control units 20 and a holding unit 12 for the operational control units 20. A control device 62 for validating control signals delivered by the operational control units 20 is also provided. The operational control units 20 are freely arrangeable within the holding device 12.

20 Claims, 1 Drawing Sheet

DRIVER INFORMATION SYSTEM

CROSS-REFERENCE TO RELATED APPLICATION

This application claims priority of German Patent Application DE 102 52 689.3, filed on Nov. 13, 2002.

BACKGROUND OF THE INVENTION

The present invention generally relates to a driver information system comprising an operating device having at least two operational control units and a holding unit for the operational control units, and a control device for validating control signals delivered by the operational control units.

Driver information systems of the afore-mentioned kind are well known and are now employed in a plurality of different vehicles. They do not only serve to display navigation information but have developed towards a central operational and control device by which a plurality of components in the vehicle may be controlled. The driver information system comprises a monitor on which relevant information as well as the option menus necessary for operation are displayed. The operation itself is carried out in many cases by means of a central operational control unit which have many degrees of freedom. In one exemplary case the operational control unit is provided as a rotary-push button. In addition to this rotary-push button further operational control units like switches and the like are provided, particularly for allowing fast navigation within the selection menus.

The operational control units are generally located in the middle part of a dashboard between the driver and the co-driver so that the operational control units may be reached easily by the driver.

Although such a driver information system is already a reliable system, there is a demand for offering different design variations with respect to the driver information system, however, without causing higher costs for custom-made parts.

SUMMARY OF THE INVENTION

In view of the above, it is an object of the present invention to fulfill this demand.

This object is solved by the driver information system of the aforementioned kind in that the operational control unit is freely configurable with respect to the holding unit.

This means with other words that the operating device is constructed of single independent operational control units, wherein these operational control units may be inserted within the holding unit at different locations. The operational control unit is hence designed as a modular system so that the user may determine individually according, to his own needs the arrangement of the single operational control units relative to each other. Moreover, this driver information system offers also the possibility due to its modular design to replace operational control units rapidly, for example because they are defect or because the user wants another type of operational control unit.

Beside the afore-mentioned advantages, the driver information system also offers the possibility that the user replaces a rotary push button e.g. with a cross-rocker-switch.

In a preferred embodiment, each of said operational control units comprises a transmitting unit, and said control device is associated with a receiving unit which receives the control signals supplied by the transmitting unit.

Providing each operational control unit with a transmitting unit, which receives the signals supplied by the control member, like a switch, a rotary push button etc., and processes them, makes it possible to encode the control signals according to a predefined protocol so that the control device may assign the received signals to one operational control unit. The best way for transmitting the control signals is to use a bus system which reduces the number of necessary lines to a minimum.

Preferably, the transmission of the control signals from the operational control unit to the receiving unit of the control device is carried out wirelessly, for example optically or by radio frequency. In case of a radio frequency transmission, the standardized bluetooth-protocol would be an option and would offer the advantage that off the shelf operational control units may be used for its construction.

In a preferred embodiment the holding unit comprises a predetermined number of operational control unit-slots and unit-places, respectively, in which the operational control units may be inserted.

This measure makes the arrangement and mounting of the operational control units in the holding device much easier since respective mounting means may be provided at predetermined locations.

In a preferred embodiment each operational control unit comprises at least one frame connector which may be inserted in a respective edge-socket-connector mounted to each operational control unit-slot. The control signals may be transmitted on-wire via this connector-socket-connection.

Although this transmission on-wire of the control signals is disadvantageous compared with a wireless transmission, the on-wire transmission has significant advantages with respect to costs. The on-wire transmission is simpler and generally less susceptible to disturbances or interferences. An additional advantage is that the operational control unit is fixed in the holding unit by means of the connector socket connection. Further members for fixing or mounting the operational control unit are hence not necessary.

In a preferred embodiment each operational control unit comprises a mounting member which detachably engages with a mounting member provided at an operational control unit-slot.

This is a very simple possibility for the user to mount the operational control units. Of course it would also be possible to detachably connect the single operational control units, which are arranged side by side, with each other, so that only a few operational control units have to be mounted at the holding unit. This approach is particularly used when the operational units are hold slidably with respect to each other within the holding unit.

The operational control units may preferably be operating elements, volume control elements, hard key elements, keypad elements, etc. However it is to be noted that this enumeration is not exhaustive, rather further operational control units may also be used. The operating device of the present invention is flexible such that it also allows the integration of not yet used types of operating elements.

It is to be understood that the features mentioned above and those yet to be explained below can be used not only in the respective combinations indicated but also in other combinations or in isolation, without leaving the scope of the present invention.

BRIEF DESCRIPTION OF THE DRAWINGS

Further features and advantages can be taken from the following description and the enclosed drawings. An embodiment of the invention is shown in the drawings and will be explained in more detail in the description below with reference to same. In the drawings.

DETAILED DESCRIPTION OF A PREFERRED EMBODIMENT

Figure 1:
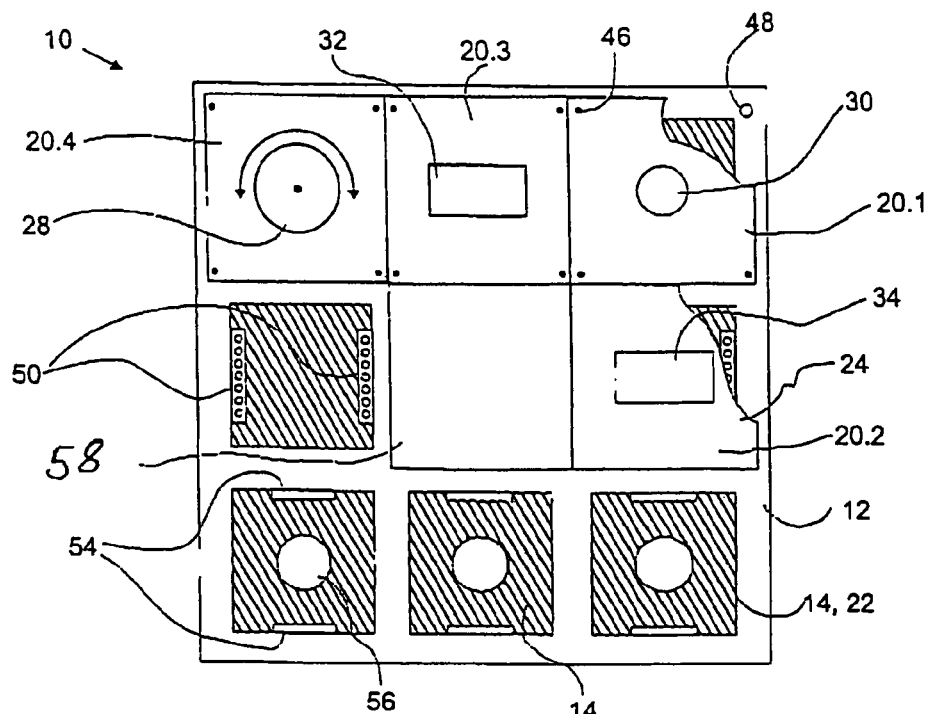
FIG. 1 shows a schematic plan view of an operating device, wherein different possibilities of control signal transmission are shown for example.

In FIG. 1 an operating device of a driver information system is schematically shown and indicated with reference numeral 10. The operating device 10 comprises a rack 12 being provided on its upper side (which is shown in FIG. 1) with a number of square openings or slots 14. The openings 14 are arranged like a chessboard having in total nine openings 14 in the present embodiment. This number is, however, chosen just as an example and may of course be greater or smaller. In the embodiment shown in FIG. 1, the nine openings 14 are evenly arranged in three columns and three rows, however, other arrangements of the openings 14 may be contemplated.

Figure 2:
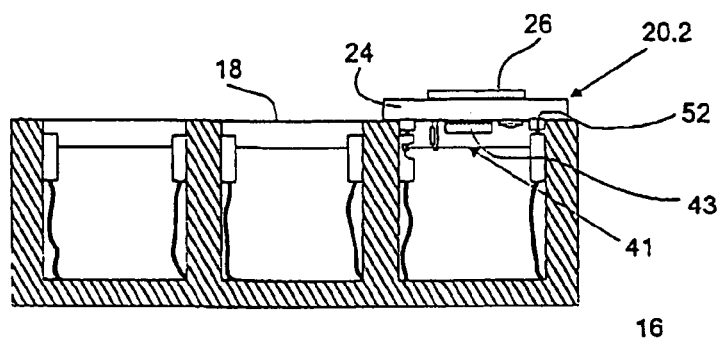
FIG. 2 shows a schematic sectional side view of the operating device of FIG. 1.

The rack 12 comprises as shown in FIG. 2 a main panel 16 which is spaced apart of the top surface 18. The main panel 16 is generally used to mount the rack 12 in the vehicle, normally in a region of the dashboard (center console) between the driver seat and the co-driver seat. For this purpose recesses in the dashboard are provided so that the top surface 18 is flush mounted with respect to the surface of the dashboard.

The operating device 10 further comprises a predetermined number of operational control units 20.1 to 20.4 which are arranged in the openings 14. The openings 14 hence form receiving slots or places 22 for the operational control units 20. Consequently, the operating device 10 shown in FIG. 1 may receive nine operational control units 20 in total. Receiving slots 22 which do not contain operational control units 20 may be closed by cover plates. In FIG. 1, such a cover plate is exemplarily shown and indicated with reference numeral 58.

Each operational control unit 20 is self contained in a functional view and operates independent of the other operational control units.

One operational control unit 20 comprises a cover plate 24, an operational control 26 being mounted on the top surface of the cover plate 24, for example a rotary push button 28, a simple rotary switch 13, a keypad 32 or a switch 34, just as to mention some few operational controls.

On the bottom side of the cover plate 24 a control circuit 41 is mounted, as shown in FIG. 2, comprising different electronic components 43. The control circuit 41 is coupled with the operational control 26 and receives control signals corresponding to the operation of the operational control 26.

The cover plate 24 is dimensioned such that the opening 14 is entirely covered, the control circuit 41 with the electronic components on the bottom side of the cover plate 24 projecting into the opening 14; this may be clearly seen in FIG. 2.

In the present embodiment, the size of the cover plate 24 has been selected such that cover plates of adjacent operational control units 20 are right next to each other so that a gap between the cover plates is as small as possible. Preferably, gaps between the cover plates are avoided.

The operational control units 20 may be mounted on the rack 12 in different ways. In FIG. 1, three possibilities of mounting are shown just by way of example. However, it is appreciated that the way of mounting is homogenous within an operating device, that is only one type of mounting the operational control units of an operating device is used.

In the upper row, the cover plates 24 comprise in each corner a bore 46, which serves to receive screws engaging in respective threaded holes 48 in the rack.

Of course, the screws may be replaced with pins formed on the bottom side of the cover plate 24. The pins may be inserted into the bores 48 in the rack 12 and may be locked therein.

In FIG. 1, the operational control units in the center row are mounted on the rack 12 by using a plug connection, an edge-socket-connector 50 being provided on at least two opposing sides of the opening 14. Adapted to this edge-socket-connector 50, a pin connector is provided on the bottom side of the cover plate 24, the pin connector being referenced in FIG. 2 with reference numeral 52. This pin connector 52 fits into the edge-socket-connector 50 and serves to fix the cover plate on the rack 12 by respective sizing the holding force of the edge-socket-connector.

A third possibility of mounting is shown in FIG. 1 in the lower row. Here, snap-in members 54 are provided on opposing sides of the opening 14. The snap-in members 54 may be locked in respective snap-in counterparts provided on the bottom side of the cover plate 24.

As already mentioned before the described three possibilities are mere exemplary and may therefore not be considered as exhaustive.

As generally be known, the operating device 10 is used to control a driver information system by selecting functions and by inputting any values. For this purpose the operational controls of the operational control units 20 are provided.

In order to transmit the control signals generated by the respective operational controls to the central control device, three possibilities are shown in FIG. 1 just as an example.

The first possibility is shown in the first row and is to transmit the control signal via radio frequency, preferably according to the bluetooth protocol, to a remote receiver which is coupled with a central control unit. The transmitter unit for this wireless transmission of the control signals is part of the control circuit 41 of an operational control unit, the receiving unit preferably being provided within the rack 12 of the operating device 10 in order to particularly keep the requested transmission power as low as possible.

The approach shown in the second row in FIG. 1 is based on an on-wire transmission and is achieved by the plug connection of the operational control unit 20 and the edge-socket-connector 15. Electrical connections are made via this plug connection which allows the transmission of control signals to the central control unit.

Finally, an example of an optical transmission of control signals is shown in FIG. 1. An optical receiving element 56, for example a phototransistor, is provided below each opening 14. As a counterpart, an optical transmission element, for example an infrared LED, is provided on the bottom side of each cover plate 24, the infrared LED transmitting downwardly to the receiving element 56.

Figure 3:
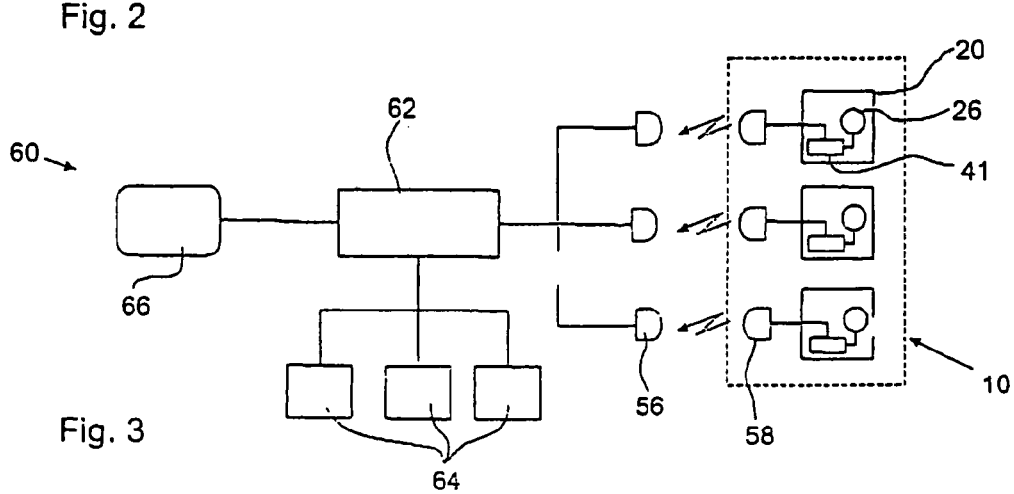
FIG. 3 shows a schematic block diagram of a driver information system with an operating device.

In FIG. 3 a simplified block diagram of a driver information system is shown and indicated with reference numeral 16. One part of this driver information system is the already described operating device 10. Further, the driver information system comprises a central control unit 62 which serves to control different components in a vehicle, for example audio components, navigation components etc. For displaying selection menus and other information a monitor 66 is provided in the dashboard, the monitor 66 being driven by the control device 62.

As already mentioned, the transmission of control signals from the different operational control units 20 may be achieved in different ways. In the block diagram of FIG. 3, the optical transmission is shown which uses IR-LEDs 58 and phototransistors 56.

Since the operational control units 20 may be placed in any receiving slot 22, each control signal is accompanied by specific identification information which allows the identification of the control signal. The control device 62 may therefore assign the control signals to the respective transmitting operational control unit 20.

The operating device 10 according to the present invention therefore offers the possibility to place the different operational control units 20 adapted to the individual requirements in any receiving slot 22.

What is claimed, is:

1. Driver information system comprising an operating device having at least two operational control units and a holding unit with a number of operational control slots each adapted to physically receive one of the operational control units, and a control device for validating control signals transmitted by the operational control units, wherein said operational control units are interchangeably arranged in the operational control slots of the holding device, each of said operational control units comprises a transmitting unit for transmitting a control signal that contains identification information identifying the particular operational control unit, and said control device is associated with a receiving unit in order to receive the control signals provided by the transmitting unit.

2. The driver information system of claim 1, wherein the transmitting unit transmits said control signals optically to the receiving unit.

3. The driver information system of claim 1, wherein the receiving unit transmits said control signals via radio frequency to the receiving unit.

4. The driver information, system of claim 3, wherein said transmitting unit and said receiving unit are adapted for transmitting using the Bluetooth protocol.

5. The driver information system of claim 1, wherein each operational unit comprises at least one frame connector which is insertable in an edge-socket-connector provided in each said operational control slot, the control signals being transmitted by wire via said connector-socket.

6. The driver information system of claim 4, wherein said operational control units are supported movably relative to each other by the holding unit.

7. The driver information system of claim 1, wherein each operational control unit comprises a mounting member provided at a operational control unit slot and engaging said mounting member detachably.

8. The driver information system of claim 1, wherein said operation control unit is one of an operating element, volume control element, and a hard-key element.

9. The driver information system of claim 1, wherein operational control units comprise identical cover plates.

10. Driver information system comprising an operating device having at least two operational control units and a holding unit with a number of operational control slots each adapted to physically receive one of the operational control units, and a control device for validating control signals delivered by the operational control units, each of said operational control units being interchangeably arranged in any one of the operational control slots of the holding device, wherein each of said operational control units comprises a transmitting unit for transmitting said control signals wirelessly, and said control device is associated with a receiving unit, in order to wirelessly receive the control signals provided by the transmitting unit.

11. Driver information system comprising an operating device baying at least two operational control units and a holding unit with a number of operational control slots each adapted to physically receive one of the operational control units, and a control device for validating control signals delivered by the operational control units, each of said operational control units being interchangeably arranged in any one of the operational control slots of the holding device, wherein each of said operational control, units comprises a transmitting unit for transmitting said control, signals optically, and said control device is associated with an optical receiving unit, in order to receive the control signals provided by the transmitting unit.

12. Driver information system comprising an operating device having at least two operational control units and a holding unit with a number of operational control slots each adapted to physically receive one of the operational control units, and a control device for validating control signals delivered by the operational control units, each of said operational control units being interchangeably arranged in any one of the operational control slots of the holding device, wherein each of said operational control units comprises a transmitting unit for transmitting said control signals by radio frequency, and said control device is associated with a radio frequency receiving unit, in order to receive the control signals provided by the transmitting unit.

13. The driver information system of claim 1, wherein said control signals include identification information identifying each of the operational control units to enable the control device to assign the control signals to the respective transmitting operational control unit.

14. The driver information system of claim 10, wherein said control signals include identification information identifying each of the operational control units to enable the control device to assign the control signals to the respective transmitting operational control unit.

15. The driver information system of claim 11, wherein said control signals include identification information identifying each of the operational control units to enable the control device to assign the control signals to the respective transmitting operational control unit.

16. The driver information system of claim 12, wherein said control signals include identification information identifying each of the operational control units to enable the control, device to assign the control signals to the respective transmitting operational control unit.

17. A driver information system for enabling the control of various components in a vehicle comprising a plurality of operational control units, a holding unit having a plurality of operational control slots each adapted to physically receive one of said operational control units, and a control device for validating control, signals produced by the operational control units and selectively controlling said vehicle components in accordance with said control signals; wherein the operational control units are interchangeably arranged in the operational control slots of the holding unit and each of said operational control units comprises a transmitting unit for transmitting a control signal containing identification information that identifies the particular operational control unit, and the control device includes a receiving unit for receiving the control signals produced by each of the transmitting units; and further wherein the data connection by which said control signals are transmitted between each operational control unit and said receiving unit is configured the same for each operational control unit.

18. The driver information system of claim 14, wherein the data connection by which said control signals are transmitted between each operational control unit and said receiving unit is configured the same for each operational control unit.

19. The driver information system of claim 15, wherein the data connection by which said control signals are transmitted between each operational control unit and said receiving unit is configured the same for each operational control unit.

20. The driver information system of claim 16, wherein the data connection by which said control signals are transmitted between each operational control unit and said receiving unit is configured the same for each operational control unit.

* * * * *

UNITED STATES PATENT AND TRADEMARK OFFICE
CERTIFICATE OF CORRECTION

| | | |
|---|---|---|
| PATENT NO. | : 8,214,004 B2 | Page 1 of 1 |
| APPLICATION NO. | : 10/706221 | |
| DATED | : July 3, 2012 | |
| INVENTOR(S) | : Taxis | |

It is certified that error appears in the above-identified patent and that said Letters Patent is hereby corrected as shown below:

At column 3, line 46, "...control unit 20..." should be changed to -- control unit 20.2 --

At column 3, line 49, "...rotary switch 13..." should be changed to -- rotary switch 30 --

At column 4, line 18, "...the cover plate on..." should be changed to -- the cover plate 24 on --

At column 4, line 20, "...edge-socket connector..." should be changed to -- edge-socket connector 50. --

At column 4, lines 47–48, "...edge-socket connector 15..." should be changed to -- edge-socket connector 50 --

At column 4, line 59, "...reference numeral 16..." should be changed to -- reference numeral 60 --

At column 6, line 5, claim 11, "...device baying..." should be changed to -- device having --

At column 6, line 57, claim 17, "...control, signals..." should be changed to -- control signals --

Signed and Sealed this
Twenty-ninth Day of January, 2013

David J. Kappos
*Director of the United States Patent and Trademark Office*